C. F. KETTERING.
MECHANICAL CLUTCH.
APPLICATION FILED OCT. 5, 1906.
923,857.
Patented June 8, 1909.
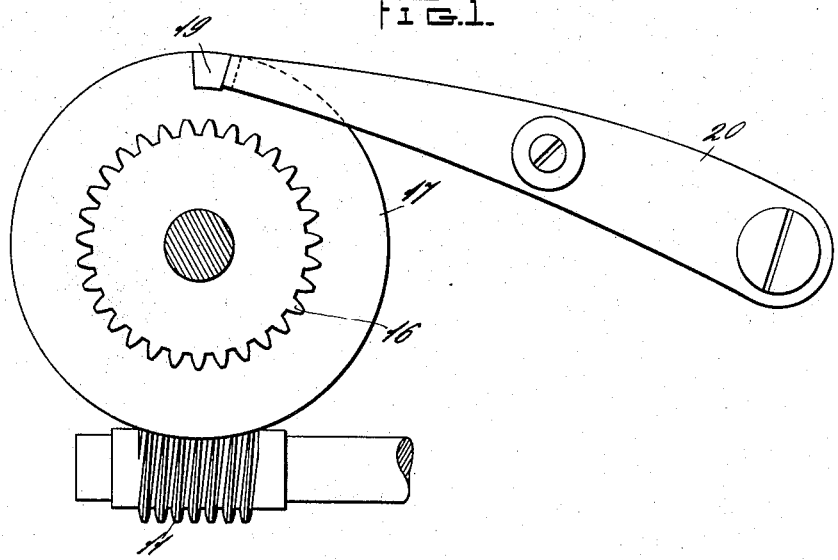
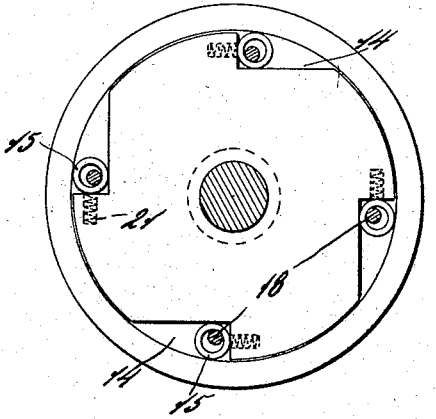
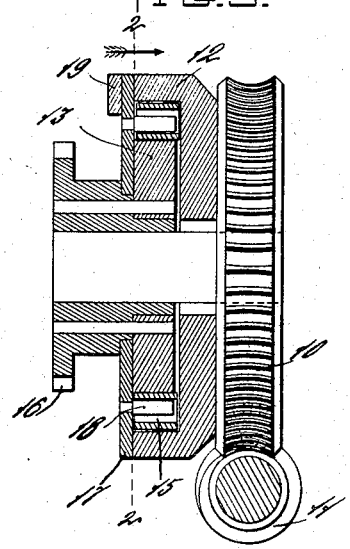
Witnesses
E. L. Fletcher
Earl W. Beust.
Inventor
Chas. F. Kettering
by J. B. Hayward
and R. C. Glass.
Attorneys

UNITED STATES PATENT OFFICE.

CHARLES F. KETTERING, OF DAYTON, OHIO, ASSIGNOR TO THE NATIONAL CASH REGISTER COMPANY, OF DAYTON, OHIO, A CORPORATION OF OHIO, (INCORPORATED IN 1906.)

MECHANICAL CLUTCH.

No. 923,857.　　　　Specification of Letters Patent.　　　　Patented June 8, 1909.

Application filed October 5, 1906.　Serial No. 337,569.

*To all whom it may concern:*

Be it known that I, CHARLES F. KETTERING, a citizen of the United States, residing at Dayton, in the county of Montgomery and State of Ohio, have invented certain new and useful Improvements in Mechanical Clutches, of which I declare the following to be a full, clear, and exact description.

This invention relates to clutches and has for a main object to provide a simple and reliable friction clutch.

Another object is to improve the type of friction clutch comprising two members which are adapted to be operatively connected by a series of balls or rollers.

With these and incidental objects in view, the invention consists in certain novel features of construction and combination of parts, the essential elements of which are set forth in appended claim and a prefered form of embodiment of which is hereinafter specifically described with reference to the drawings which accompany and form part of this specification.

Of said drawings: Figure 1 is a detail side elevation of the clutch showing a stop bar. Fig. 2 is a section on line 2—2 of Fig. 3. Fig. 3 is a partial sectional view of the clutch and driving mechanism.

The clutch shown in the drawings and claimed herein is adapted to be used in many kinds of machines, such for example as sewing machines and cash registers where it is desired to intermittently connect the mechanism to be driven to a constantly running driving mechanism and at the same time to provide means for quickly and certainly detaching the driven mechanism and stopping it.

Described in general terms the clutch consists of a driving member shown herein as a cup shaped disk which is rigidly connected to some motor mechanism such for example as an electric motor.

The driven member comprises a plate having peripheral recesses in which are mounted rollers serving to connect the said driven plate to the driving disk. The rollers are mounted on a separate plate and are adapted to be forced to connecting position by springs. A stopping device here shown as a pivoted arm is provided and is adapted to engage the roller carrying plate to disconnect the two members of the clutch.

It may be said that this invention consists of constantly revolving elements such as a worm wheel and pinion 10 and 11 driven by any suitable power, for example an electric motor, connected to any machine or apparatus to be driven by a spring operated friction clutch.

Referring to Figs. 2 and 3 it will be seen that the clutch consists of two main parts 12 and 13. The part 12 is a cup like disk which is rigidly secured to the side of the worm gear 10 and revolves with the same. The part 13 consists of a plate having recesses 14 cut in its periphery in which are loosely positioned rollers 15. A gear 16 is pinned to plate 13 and is geared to the machine or apparatus to be driven. There is also a plate 17 which carries pins 18 and is mounted loosely upon the hub of the gear wheel 16. On the outer face of the plate 17 is mounted a lug 19 which contacts at certain times with a stop bar 20. The plate 17 serves to control the coupling and uncoupling of parts 12 and 13 of the clutch. The pins 18 extend into the holes of the rollers 15 which are larger than said pins thereby allowing the rollers to have a slight movement independent of the pins 18. Said pins normally hold the rollers against the tension of springs 21, which are contained in borings in the plate 13. The stop bar 20 is actuated by any suitable means to release the plate 17 when raised and to come into the path of the lug 19 when lowered again.

The operation of the clutch is as follows: The disk 12 revolves in the direction of the arrow in Fig. 2 but the plate 13 will remain stationary until the stop bar 20 is raised out of the path of the lug 19. As soon as the plate 17 is released it will be thrown forward by the springs 21 thereby releasing the rollers 15 which will be wedged between the rim of the disk 12 and the plate 13. This will connect the plate 13 to the disk 12 causing them to rotate together. When the stop bar 20 is returned to its normal position the lug 19 will contact with said bar and will stop the plate 17 carrying the pins 18. When this happens the pins 18 being now stationary will (as the disk 12 and the plate 13 continue to rotate) force the rollers 15 back to their normal position against the tension of the springs 21 thereby releasing the driven member from the driving element and when the rollers 15 abut the sides of their recesses they will positively stop the plate 13 and the mechanism driven thereby while allowing the disk 12 to continue its movement.

It will be seen that this mechanism provides a simple and reliable clutching device and may be easily thrown out of operation. In prior patents clutches including such rollers as I have shown have been used but in most such cases the only method of disconnecting the driving from the driven mechanism has been to stop the driver in as much as any attempt to stop the driven mechanism would only serve to connect the two members more tightly. In this construction however the disconnection is obtained by causing a reverse relative movement of the connecting rollers which evidently serve to carry said rollers into the widest part of the recesses 14.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claim which follows.

What is claimed is as follows:

A clutch comprising a driving ring and a driven disk inside the ring and having peripheral recesses, a controlling plate having pins projecting therefrom one into each recess, a roller loosely mounted on each of said pins, spring plungers seated in said driven disk and bearing against said rollers, and an arm movable out of the path of said controlling plate but normally positioned to be engaged by said plate and stop the same.

In testimony whereof I affix my signature in the presence of two witnesses.

CHARLES F. KETTERING.

Witnesses:
    Roy C. Glass,
    Carl W. Beust.